Sept. 24, 1935.  L. L. FOUNTAIN  2,015,556
REGULATOR SYSTEM
Filed April 14, 1934
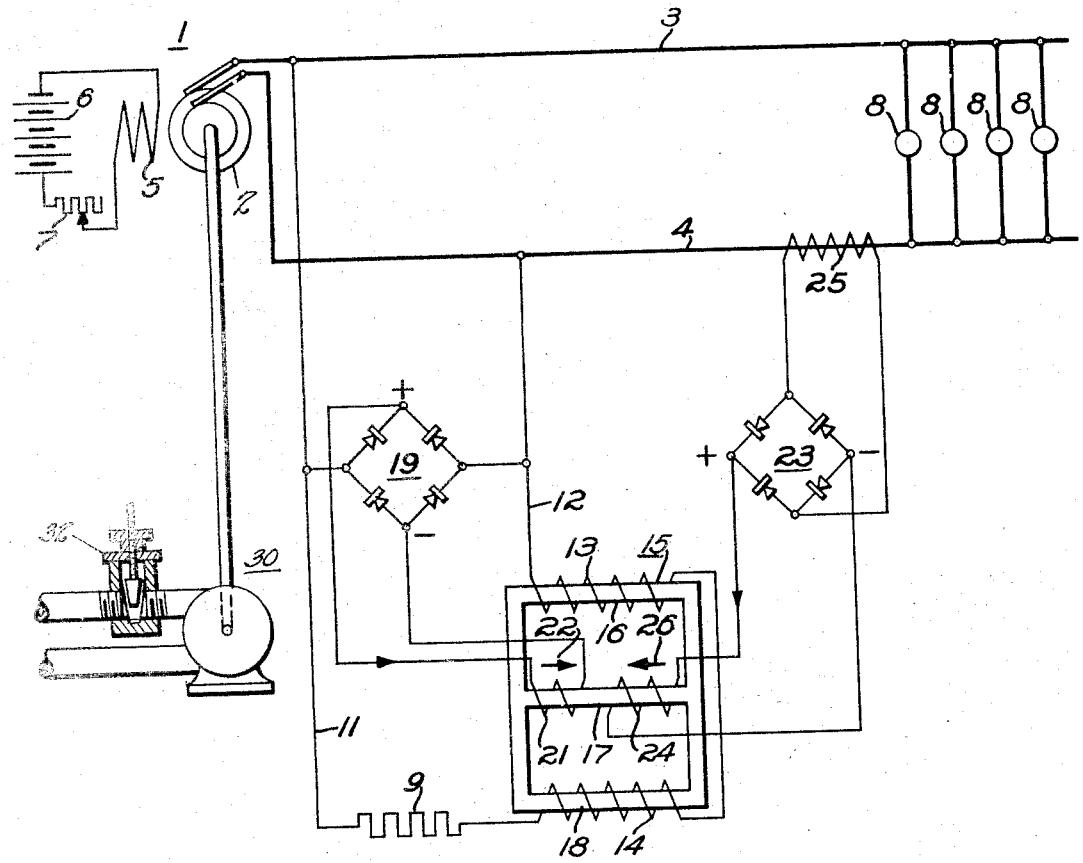
WITNESSES:
INVENTOR
Lawrence L. Fountain.
BY
ATTORNEY Patented Sept. 24, 1935

2,015,556

UNITED STATES PATENT OFFICE 2,015,556

REGULATOR SYSTEM

Lawrence L. Fountain, Wilkinsburg, Pa., assignor to Westinghouse Electric & Manufacturing Company, East Pittsburgh, Pa., a corporation of Pennsylvania Application April 14, 1934, Serial No. 720,620

4 Claims. (Cl. 290—40)

My invention relates to electrical regulators and regulator systems, and more particularly to regulator systems for regulating the voltage of electric feeder circuits.

In certain generator applications, such as where small waterwheel driven generators are employed, for supplying relatively small amounts of local power, as in farm lighting installations, it is frequently desirable to operate the waterwheel or similar prime mover over a considerable period with a constant gate opening corresponding to a relatively constant supply of power to the prime mover, instead of providing regulator means for controlling the supply of power to the prime mover in accordance with changes in the speed of the generator, or of the load on the generating unit.

In the operation of such units, it is also frequently undesirable for economic reasons to provide a generator voltage regulator of the type that varies the excitation of the generator in accordance with variations in line voltage.

In such generator installations changes in the load on the distribution circuit cause changes in the speed, frequency, and voltage of the generator, these quantities increasing with a decrease in load, and decreasing with an increase in load on the feeder circuit supplying the load.

An increase in generator voltage occasioned by a decrease in the load on a circuit may, under certain conditions, be considerable in extent and sufficient to either burn out light bulbs or other electrical equipment supplied from the feeder circuit, or to greatly shorten the useful life of the electric light bulbs or other equipment employed, thus materially increasing the maintenance cost of the system.

In accordance with my invention, means is provided for maintaining a substantially constant load on the generator, thereby causing its speed, voltage and frequency to be maintained substantially constant.

My invention will be better understood from the following description, taken in connection with the accompanying drawing and its scope will be pointed out in the appended claims.

In the drawing, the single figure is a diagrammatic view of circuits and apparatus comprising one preferred embodiment of the invention.

Referring to the drawing, a generator 1 is provided having an armature winding 2 for supplying alternating current energy through the feeder or supply circuit represented by the conductors 3, 4 and with a field winding 5 that is connected to any suitable direct current energy source 6 through control apparatus, such as the rheostat 7, which may be adjusted to establish the proper current flow in the field circuit.

The generator is illustrated as being driven by a water turbine 30 or other prime mover to which the input may most advantageously be maintained at a relatively constant value. While in the turbine shown input adjustment may be effected by changing the setting of a valve 32 in the water-supply conduit, in those situations to which the present invention is directly applicable it is preferable to allow this valve to continuously remain at a given point of opening which is adequate to supply the maximum power demands to which the driven generator may be subjected.

The feeder circuit comprises conductors 3 and 4 through which power is supplied to a load represented in the drawing by the devices 8 and which may be any electrically operated equipment such as lamps, motors, or heating devices that are usually supplied with energy from such a circuit.

A load consuming device, such as the resistor 9, is provided, and is connected by conductors 11 and 12 in a circuit that is a parallel circuit in relation to the load 8, and that is in series circuit relation with the windings 13 and 14 of a reactance device 15, here shown as an iron core reactor having three winding legs 16, 17 and 18, the windings 13 and 14 being illustrated as wound about the outside legs 16 and 18, respectively. A rectifying device 19, which may be of any suitable construction, but is here illustrated as a full-wave rectifier of the dry-disc copper-oxide type, is provided and energized from the alternating current circuit conductors 3, 4 and supplies direct current to a winding 21 wound about a portion of the middle leg 17 of the reactor 15.

A rectifier 23 is connected to be supplied with alternating current from the secondary winding of a current transformer 25 through the primary winding of which the load current supplying the load 8 passes. The rectifier 23 may be similar in construction to the rectifier 19 and is arranged to supply direct current to a winding 24 that is also wound about the middle leg 17 of the reactor 15. The windings 21 and 24 are so connected to the rectifiers 19 and 23, respectively, as to produce flux in the winding leg 17 that is in phase opposition as indicated by the arrows 22 and 26. That is to say, the actual flux produced by the two windings 21 and 24 is responsive to the differential ampere turns in these two windings.

If the current in the supply circuit is at its normal full-load value, the flux produced by the winding 24 will preferably be equal and opposite to the flux produced by the winding 21, so that the total result of the energization of these two windings is negligible and the current through the circuit comprising reactor windings 13, 14 and the resistor 9 is likewise negligible. If, now, the load on the supply circuit decreases, the current through the primary winding of the current transformer 25 correspondingly decreases, as does the direct current from the rectifier 23 through the winding 24. This decrease in the flux produced by the winding 24 fails to completely neutralize the flux produced by the winding 21, and the differential effect of the two windings 21 and 24 is to cause a certain amount of flux to flow from the winding leg 17 through the reactor core, thus decreasing the reactance of the windings 13 and 14 and permitting a certain amount of current to flow from the generator through the resistor 9. A still further decrease in the current in the supply circuit will cause a corresponding further decrease in the direct current through the winding 24 and a corresponding increase in the flux induced from the winding 21, causing a greater degree of saturation of the reactor core.

In the event that the current in the supply circuit exceeds the normal full load value the ampere turns produced by winding 24 will, under the conditions above stated, of course overbalance those produced by winding 21 and tend to saturate the core structure. To eliminate this undesirable possibility, the two named windings may be so proportioned that at normal full load circuit current the constantly energized winding 21 will still substantially overbalance the ampere turns produced by the load-responsive winding 24. In such case, until the thus allowed margin of overload is exceeded, operation will continue in the desired manner.

As the saturation of the core increases the effectiveness of value of the reactance of the windings 13 and 14 decreases, thus permitting a larger amount of power to flow from the generator through the resistor 9. The system is so designed and adjusted that the power flowing through the parallel circuit represented by the conductors 11, 12, the resistor 9, and the reactor windings 13, 14, increases in proportion to the decrease in the current flowing to the load 8, so that, at all times, a substantially constant load is maintained on the generator 1. Since the power supplied to the prime mover driving the generator 1 is constant, the speed and consequently the voltage and frequency of the generator will also remain substantially constant.

Many modifications of the circuits and apparatus disclosed in the illustrated embodiment of my invention will appear to those skilled in the art, and I do not wish to be limited otherwise than by the scope of the appended claims.

I claim as my invention:

1. In a generating system wherein a load-circuit is supplied by an electrical generator driven by a prime mover having a substantially constant power input, means for maintaining a substantially constant frequency and voltage on the generator comprising a static power consuming device connected to be energized from said generator, and static means responsive to the current in said load circuit for so varying the power consumed by said power consuming device as to maintain a substantially constant electrical load on said generator.

2. In a generating system wherein a load circuit is supplied by an electrical generator driven by a prime mover having a substantially constant power input, means for maintaining a substantially constant frequency, voltage and loading on the generator comprising an auxiliary load-consuming circuit which includes a reactor having an iron core, and means for so controlling the degree of saturation of said core in accordance with changes in the current in the first-named load circuit as to cause the reactor impedance to vary inversely with said current changes.

3. In a generating system wherein a load circuit is supplied by an electrical generator driven by a prime mover having a substantially constant power input, means for maintaining a substantially constant frequency, and voltage and loading on the generator comprising an auxiliary load-consuming circuit including an iron core reactor having windings connected to said generator through said circuit, means for saturating the core of said reactor, and means energized in accordance with the current in the first named load circuit for opposing said saturating means to thereby cause the reactor impedance to vary inversely with the changes in said current.

4. In combination, an alternating current circuit, a variable load connected to said circuit, a saturable inductive reactor connected in parallel with said load, a resistor connected in series with said reactor, a direct current winding energized for saturating said reactor, a second direct current winding differentially related to said first named winding, and means comprising a current transformer and a rectifier for energizing said second named direct current winding in accordance with the load current flowing in said circuit.

LAWRENCE L. FOUNTAIN.